3,356,640
STABILITY OF POLYOLEFINES
Gerhard Meyer, Obernburg, Erhard Siggel, Seckmauern uber Hochst, Odenwald, Albert Schöpf, Hering uber Hochst, Odenwald, and Helmut Mägerlein, Erlenbach, Germany, assignors to Vereinigte Glanzstoff-Fabriken AG., Wuppertal-Elberfeld, Germany
No Drawing. Filed Jan. 26, 1965, Ser. No. 428,231
15 Claims. (Cl. 260—45.9)

ABSTRACT OF THE DISCLOSURE

Stabilizing a high molecular weight poly-α-monoolefine such as polypropylene against oxidation by treating it in finely divided form dispersed in an inert hydrocarbon liquid containing a small amount, e.g., 0.01 to 1% by weight with reference to the poly-α-monoolefine, of an organic mono- or di-nitrile under agitation and in the presence of UV-rays, for example at temperatures of 20–130° C. for a period of one-half to one hour, and then separating the poly-α-monoolefine from the liquid medium. Examples of the nitriles include acetonitrile, adiponitrile, acrylonitrile and benzonitrile. The resulting stabilized poly-α-monoolefine is useful in producing filaments, films and molded articles resistant to oxidation.

---

This invention is concerned with a process for treatment of high molecular weight polyolefines so as to improve their stability against oxidation. More particularly, the invention relates to a method of contacting a polyolefine with a specific treating agent under conditions which are sufficient to enhance the oxidation-resistance of the resulting polyolefine product.

It is known that valuable products in the form of filaments, films, foils or other extruded or molded articles can be produced from polyolefines obtained by the addition polymerization of monomeric olefines, such as the alpha-monoolefines of from 2 up to about 10 carbon atoms. Especially favorable properties are exhibited by solid high molecular weight polyolefines which have been obtained by the so-called low pressure polymerization process requiring the use of a stereospecific catalyst or the so-called Ziegler catalysts. Although such polyolefines have advantageous properties such as high strength, high density, relatively higher melting points and general resistance to chemical attack, they exhibit a somewhat limited stability against attack by oxygen, especially where there is simultaneous application of heat and/or exposure to ultraviolet rays. The damage shown by polyolefines under such oxidation conditions has been attributed to the presence of double bonds in or on the molecular chain of the polymer, these double bonds or olefinically unsaturated portions of the molecule being particularly susceptible to attack by oxygen. It does not appear to be possible to prevent or avoid the occurrence of these double bonds by any special precautions during polymerization. Therefore, in order to improve the stability of the polyolefine, it is apparently necessary to subject the polymer to an after-treatment which will tend to saturate the double bonds.

For example, it has been suggested that the polymer be subjected to a treatment with certain silicon compounds in which at least one hydrogen atom is attached directly to the silicon atom. In this known process, the polyolefine must be dissolved in a solvent and stirred for a relatively long period of time together with the silicon compound and a suitable catalyst. Aside from the fact that this process requires the use of considerable amounts of solvents and precipitation agents, it is unusually expensive because a thorough purification must be carried out after the treatment with the silicon compound and precipitation of the treated polymer from its solution.

According to an alternative of this known process, the stabilizing treatment can also be carried out by mixing the polyolefine with the silicon compound in an extruder at elevated temperatures, e.g., 250–300° C. However, a uniform stabilization is not obtained in this manner. Furthermore, this process suffers from the disadvantage that the silicon compound remains in the polymer.

In another known process, hydrogenation of the double bonds has been attempted in order to solve the problem of stabilization. The polyolefine in the form of a solution, emulsion or suspension is conducted through a suitable hydrogenation reaction vessel where it is brought into contact with a specific hydrogenation catalyst. This process requires a considerable expenditure in apparatus and time and is not suitable for treating large amounts of polyolefines. Finally, this method is disadvantageous in that the treated polyolefine must be subjected to additional steps for removal of the heterogeneous hydrogenation catalyst which would otherwise cause trouble in the normal processing of the polyolefine into finished articles.

The primary object of the present invention is to provide a process of treating a polyolefine which will lead to an improved product exhibiting better resistance to oxidation and aging, especially such oxidation as may occur in normal use of the polymer where it is exposed to heat and light.

Another object of the invention is to improve the stability of polyolefines against oxidation by a process or method which can be carried out in an economical manner and under easily controlled conditions.

Yet another object of the invention is to provide a process for improving the stability of polyolefines whereby conventional apparatus can be employed and the necessary steps can be readily combined with conventional polymerization processes for the production and separation of a substantially pure polyolefine.

Still another object is to improve the polyolefine stability by a process which permits the treatment of large quantities of the polymer on a commercial scale.

These and other objects and advantages of the invention will become more apparent after considering the following detailed specification.

It has now been found, in accordance with the present invention, that an improved polyolefine product can be obtained by dispersing the polyolefine as a finely divided powder in an inert hydrocarbon liquid containing a small amount of a cyano compound selected from the group consisting of organic mononitriles and dinitriles, and heating this dispersion with mixing or agitation in the presence of UV-rays and at a temperature of from about 20° C. up to the boiling point of the inert hydrocarbon liquid, e.g. from about 20° C. to 130° C. and preferably about 20°–100° C., for a period of time sufficient to enhance the oxidation-resistance of the polyolefine. The polyolefine is then separated from the dispersion, for example, by filtration and is then preferably washed two or more times with the inert hydrocarbon liquid and finally dried by evaporation or distilling off any adherent hydrocarbon liquid.

The process of the present invention is particularly advantageous for the treatment of poly-alpha-monoolefines of from 2 up to about 8 carbon atoms in the monomeric alpha-monoolefine, and especially good results have been achieved with the treatment of the polyolefines of the 3 to 6 carbon atom monomers, e.g. polypropylene, polybutylene or poly-4-methylpentene-1. The results are also quite significant where the treatment is applied to stereoregulated or isotactic polyolefines as obtained by polymerization of the olefine under low pressure conditions in the presence of particular catalyst systems commonly referred to as stereospecific catalysts. These catalyst systems are well known in this art as well as the polymerization conditions and methods of recovering the isotactic polymer product, the preferred Ziegler catalyst contains $TiCl_3$ in combination with a trialkyl aluminum, e.g. triethyl aluminum.

The process of the invention is most conveniently carried out after the polyolefine has been purified, i.e. after polymerization has taken place and the polymer has been purified by removing and recovering the catalyst components therefrom. In the case of Ziegler type catalysts which are acid-soluble, the polymerization product is extracted with alcoholic-HCl, e.g. weak HCl in methanol, and the polymer is then washed and/or neutralized for substantially complete removal of the extractant and catalyst components. At this point, the purified polyolefine is in the form of a finely divided powder which can be readily subjected to the stabilizing treatment of the invention. Furthermore, the preceding steps are carried out in conventional apparatus with the substantial exclusion of oxygen and water, and the purified polyolefine can then be treated in the same apparatus under the same conditions of an oxygen-free and moisture-free environment, thereby avoiding any procedural complications in the overall process.

The purified polyolefine powder is normally obtained in conventional polymerization processes in a particle size which is quite suitable for the stabilizing treatment of the invention within a reasonable period of time. Smaller particles can usually be treated at lower temperatures and/or shorter periods of time. In general, it is desirable to use particle sizes of about 0.1 m$\mu$ to 500 m$\mu$.

The cyano compound employed as the treating agent can be added to the inert hydrocarbon dispersing liquid in quite small amounts of at least 0.01% and preferably about 0.1 to 1% by weight, with reference to the total amount of the polyolefine. Somewhat higher amounts of the cyano compound, e.g. up to 2% or even 5% by weight, with reference to the polyolefine, can also be employed but without any special advantage.

Suitable cyano compounds include both saturated and unsaturated mono- and di-nitriles of 2 to 18 carbon atoms, e.g. aliphatic nitriles such as acetonitrile, butyronnitrile and acrylonitrile; aromatic nitriles such as benzonitrile; araliphatic nitriles such as benzylcyanide; or dinitriles such as adipodinitrile. In general, the preferred cyano compounds can be represented by the formula $R(CN)_x$ wherein R represents a saturated or ethylenically unsaturated hydrocarbon radical of 2 to 18 carbon atoms and $x$ is an integer of 1 to 2. Other useful cyano compounds include the following: propionitrile, valeronitrile, capronitrile, nonyl cyanide, lauryl cyanide, stearyl cyanide, cyclohexyl cyanide, allyl cyanide, methacryl cyanide, m-tolunitrile, o-tolunitrile, p-tolunitrile, $\alpha$-naphthonitrile, $\beta$-naphthonitrile, phenylacetonitrile, malonic dinitrile, succinic dinitrile, glutaric dinitrile, pimelic dinitrile, sebacic dinitrile, maleic acid dinitrile, phthalic dinitrile. These cyano compounds can be produced according to the generally known procedures, e.g. by condensation of organic, halogen containing compounds with cyano compounds of metal [Wöhler, Ann. 3, 267 (1832)] or by catalytic dehydrogenation of primary amines [Sabatier, Compt. rend. 165, 224 (1917)] as well as by dehydration of oximes [Gabriel, Ber. 14, 2338 (1881)] and carbonic acid amides [(Wöhler, Ann. 3, 249 (1832)] and according to the well-known reaction of Sandmeyer.

As dispersing agents, any of the following inert hydrocarbon liquids can be used: pentane, hexane, heptane, benzine, benzene, toluene, xylene, Decalin, Tetralin or diesel oil. Any hydrocarbon liquid can be employed because it is essentially inert, i.e. it has no chemical influence in the stabilizing treatment. Instead, the hydrocarbon merely serves as a diluent or a dispersing agent for the powdered polymer and also acts as a solvent to dissolve the treating agent. Of course, it is also possible to use mixtures of these inert hydrocarbons or to use a different liquid for washing than is used during the treatment itself, but it is generally more convenient to use just one liquid for all of the process steps.

It is particularly desirable to employ a hydrocarbon liquid as the dispersing agent which is easily volatilized because it is then much easier to separate and recover the inert liquid after the stabilizing treatment is completed. For example, hydrocarbons with boiling points below about 100° C. are especially useful.

The temperatures and periods of time for any specific treatment will vary over a relatively broad range, depending upon a number of different factors. The stabilizing treatment is usually completed more quickly at higher temperatures. However, it is a particular advantage of the present invention that good results can be achieved at temperatures below 100° C., and optimum results are often obtained at about room temperature or about 20° C. In this connection, the term "heating" is employed herein with the meaning that the dispersion can be maintained at a substantially constant temperature, such as room temperature, and in fact it is generally necessary to apply indirect cooling to the dispersion in order to counteract the heat supplied by the lamp employed for ultraviolet radiation.

In general, the process of the invention can be accomplished within treatment periods of about 20 minutes up to 2 hours, and preferably about 30 minutes to 1 hour.

By comparison with known stabilizing methods, the process of the present invention offers the advantage that it can be carried out directly in conjunction with the preceding purification of the polymer without interfering with the normal polymerization or the separation and recovery of the polymerization catalyst and purified polymer. All of the hydrocarbon dispersing agents suitable for the stabilizing process are also solvents which have been found to be useful in the purification process. The excess dispersing liquid can be separated by filtration or centrifuging, and the polymer is easily purified to remove substantially all of the treating agent by a simple washing with the inert hydrocarbon liquid. Thus, it is possible to avoid a special purification as is required in known methods which use a heterogeneous catalyst for the stabilizing treatment. A much more uniform and extensive stabilization is obtained by contacting the polyolefine powder with the cyano compound contained in the dispersing agent according to the invention than is possible by incorporating or engraining a stabilizing agent into the polymer.

The process of the invention is further illustrated but not limited by the following examples.

*Examples 1–9*

In a 1-liter two-necked flask equipped with an agitator and a mercury immersion lamp (70 watt), 100 grams of polypropylene or poly-4-methylpentene-1 were dispersed in 600 ml. of the dispersing agent under a nitrogen atmosphere. The polyolefine was produced by polymerization of propylene or 4-methylpentene-1 in the presence of triethyl aluminum and $TiCl_3$ as a stereospecific catalyst. After completion of the polymerization, the resulting polymer powder was purified with hexane and with methanol in admixture with hydrochloric acid, washed neutral and then dried. A specific treating agent was then added to the dispersion, mixing was begun and the UV-lamp was turned on. The dispersion was then maintained at a substantially constant temperature for the desired period of treatment, the details of each example being given in the table below. Because of the heat developed by the lamp, the flask was externally cooled with water. In order to avoid an undesirable decomposition of the polymer, the lamp was turned off after the first two minutes in each five-minute period throughout the complete time of treatment. After the stabilizing treatment was completed, the polymer was filtered off, washed twice with 100 ml. of the dispersing agent and dried. The resulting polymer was then measured for its oxidation stability.

TABLE

| Example No. | Treating agent | Percent by weight* | Dispersing agent | Treatment period | Temp., °C. | Stability, minutes |
|---|---|---|---|---|---|---|
| 1 | Acetonitrile | 1 | Heptane | 45 min | 20 | 115 |
| 2 | do | 0.3 | do | 1 hr | 20 | 106 |
| 3 | Adipodinitrile | 1 | do | 1 hr | 20 | 106 |
| 4 | Acetonitrile | 1 | do | 1 hr | 98 | 105 |
| 5 | Acrylonitrile | 1 | do | 1 hr | 20 | 99 |
| 6 | Benzonitrile | 0.75 | do | 1 hr | 20 | 92 |
| 7 | | | do | 1 hr | 20 | 72 |
| 8 | Acetonitrile | 0.8 | do | 1 hr | 20 | 13 |
| 9 | | | do | 1 hr | 20 | 8 |

*Percent by weight taken with reference to the amount of the polyolefine.

Examples 1–7 of this table relate to the treatment of polypropylene, whereas Examples 8 and 9 are concerned with the treatment of poly-4-methylpentene-1 which was otherwise obtained and treated in the same manner as polypropylene. Examples 7 and 9 were carried out as control experiments in which the treating agent was omitted.

For determination of the stability of the treated polyolefine in the foregoing examples, 30 grams of the polymer powder were ground in a ball mill for a period of 30 minutes with a stabilizing mixture of 0.03 gram dilauryl-thiodipropionate and 0.03 gram of 4,4'-thio-bis-(3-methyl-6-t-butyl-phenol), i.e. 0.1% by weight in each case. 12 grams of this mixture were pressed in a plate press at 170° C. and under a pressure of 350 atm. into at 1 mm. thick plate. The plate was cut into strips 3–4 mm. wide and 30–40 mm. long from which 3 grams were introduced into a test tube standing in an aluminum block maintained at 200±1.5° C and connected to an oxygen burette. By controlling the volume of oxygen, the time in minutes was determined by the spontaneous absorption of oxygen to begin. This induction period for the oxidation of the polymer at 200° C. in pure oxygen serves as a measure of the stability at room temperature. In the case of poly-4-methylpentene-1, the measurement was carried out at 230° C. and the oxygen was introduced into the stabilized, unpressed powder contained in the test tube. Similar results can be achieved under conditions corresponding to the preceding examples by treating the polyolefine with organic mononitriles and dinitriles such as propionitrile, valeronitrile, capronitrile, nonyl cyanide, lauryl cyanide, stearyl cyanide, cyclohexyl cyanide, allyl cyanide, methacryl cyanide, m-tolunitrile, o-tolunitrile, p-tolunitrile, α-naphthonitrile, β-naphthonitrile, phenylacetonitrile, malonic dinitrile, succinic dinitrile, glutaric dinitrile, pimelic dinitrile, sebasic dinitrile, maleic acid dinitrile, phthalic dinitrile and or dispersing agents such as pentane, hexane, octane, isooctane, cyclohexane, benzine, benzene, toluene, xylene, Decalin, Tetralin or diesel oil.

The invention is hereby claimed as follows:

1. A process for improving the stability of a high molecular weight poly-α-monoolefine which comprises: dispersing said poly-α-monolefine as a finely divided powder in an inert hydrocarbon liquid containing a small amount of cyano compound selected from the group consisting of organic unsaturated mononitriles of 2 to 18 carbon atoms, unsaturated dinitriles of 2 to 18 carbon atoms, saturated mononitriles of 2 to 18 carbon atoms and saturated dinitriles of 2 to 18 carbon atoms heating said dispersion with agitation in the presence of UV-rays and at a temperature of from about 20° C. up to the boiling point of the inert hydrocarbon liquid for a period of time sufficient to enhance the oxidation-resistance of said poly-α-monoolefine; and separating the poly-α-monoolefine from said dispersion.

2. A process as claimed in claim 1 wherein said cyano compound is present in an amount of at least about 0.01% by weight with reference to said poly-α-monoolefine.

3. A process as claimed in claim 1 wherein said cyano compound is present in an amount of about 0.1 to 1% by weight, with reference to said poly-α-monoolefine.

4. A process as claimed in claim 1 wherein said dispersion is heated for a period of about 30 minutes up to about one hour.

5. A process as claimed in claim 1 wherein said dispersion is heated at a temperature of about 20° C. to 130° C.

6. A process as claimed in claim 1 wherein said dispersion is heated at a temperature of about 20° C. to 100° C.

7. A process as claimed in claim 1 wherein said cyano compound is acetonitrile.

8. A process as claimed in claim 1 wherein said cyano compound is adipodinitrile.

9. A process as claimed in claim 1 wherein said cyano compound is acrylonitrile.

10. A process as claimed in claim 1 wherein said cyano compound is benzonitrile.

11. A process as claimed in claim 1 wherein said dispersion is heated for about 30 minutes up to about one hour in the presence of about 0.1 to 1% by weight of said cyano compound, with reference to said poly-α-monoolefine, at a temperature of about 20° C. to 100° C., and the poly-α-monoolefine is separated from the dispersion and washed with said inert hydrocarbon liquid.

12. A process as claimed in claim 11 wherein said polyolefine is poly-α-monoolefine.

13. A process as claimed in claim 11 wherein said poly-α-monoolefine is poly-4-methylpentene-1.

14. The stabilized poly-α-monoolefine product obtained by the process of claim 1.

15. The stabilized poly-α-monoolefine product obtained by the process of claim 11.

References Cited

UNITED STATES PATENTS 2,811,514  10/1957  Hagemeyer _____ 260—94.9
3,143,523  8/1964   Caldo _____ 260—45.9
3,218,117  11/1965  Chen et al. _____ 204—159.17

DONALD E. CZAJA, Primary Examiner.

M. J. WELSH, Assistant Examiner.

UNITED STATES PATENT OFFICE
CERTIFICATE OF CORRECTION

Patent No. 3,356,640 December 5, 1967

Gerhard Meyer et al.

It is certified that error appears in the above identified patent and that said Letters Patent are hereby corrected as shown below:

In the heading to the printed specification, between lines 8 and 9, insert -- Claims priority, application Germany, Jan. 31, 1964, V 25,295 --. Column 3, line 43, "butyronnitrile" should read -- butyronitrile --. Column 6, line 51, "polyolefine is poly-α-monoolefine" should read -- poly-α-monoolefine is polypropylene --.

Signed and sealed this 25th day of November 1969.

(SEAL)
Attest:

Edward M. Fletcher, Jr.            WILLIAM E. SCHUYLER, JR.
Attesting Officer                 Commissioner of Patents